United States Patent Office 3,405,093
Patented Oct. 8, 1968

3,405,093
PROCESS FOR HYDROLYZING
POLYEPOXIDE RESINS
Eddie B. Walker, Lake Jackson, Tex., assignor to The
Dow Chemical Company, Midland, Mich., a corporation of Delaware
No Drawing. Filed Dec. 5, 1966, Ser. No. 598,956
3 Claims. (Cl. 260—47)

ABSTRACT OF THE DISCLOSURE

Polymeric polyhydric alcohols are prepared by hydrolysis of polyepoxides dissolved in certain solvents or solvent mixtures, catalyzed by dilute aqueous acid solutions.

---

This invention relates to an acid catalyzed process to hydrolyze polyepoxide resins. More particularly, it relates to an aqueous process wherein the hydrolysis or hydration of a polyepoxide resin is improved by the admixture of certain solvents or solvent mixtures.

The catalytic hydrolysis of an epoxide group is well known. However, the hydrolysis of polyepoxides to polymeric polyhydric alcohols by aqueous catalyst solutions is complicated by competing reactions which often produce cross-linking of the resins and by the low solubility of polyepoxides in water. Consequently, alternate methods of synthesis have been utilized to produce the hydrolyzed product, reactions such as forming the acetate ester of the polyepoxide followed by saponification or forming the sodium phenolate followed by reaction with a chlorohydrin.

It is an object of this invention to provide a process for the hydrolysis of polyepoxide resins to polymeric polyhydric alcohols. Another object is to provide an acid catalyzed process for the hydrolysis of polyepoxides which utilizes a dilute aqueous acid solution. A further object is to provide a solvent system for the hydrolysis reaction which greatly improves the reaction when used with high molecular weight polyepoxide resins.

The process of the present invention comprises dissolving the polyepoxide resin in a solvent, to be more fully described. The polyepoxide solution is then admixed with a dilute aqueous solution of an acid catalyst followed by heating with agitation. The reaction may be run under superatmospheric pressure if desired. When the reaction is complete, the mixture is cooled and the organic layer separated. The organic layer is washed until free of acid and then distilled to remove the solvent.

The choice of a solvent is dependent on several factors. The solvent should have good solubility for the polyepoxide compound. While the invention is operative with dilute solutions, it is preferred that solutions of from 20 to 40 weight percent be utilized for reasons of production economics. The polyepoxide-solvent solution should also have some solubility for the dilute aqueous acid solution, not more than 25 percent by weight at room temperature based on the polyepoxide-solvent weight and preferably in the range of 10–15 percent by weight. The solvent, itself, should also have very little solubility in water, preferably less than 1 percent by weight at room temperature.

The solvent solubility factors can be illustrated using the monophenyl ether of ethylene glycol as the solvent. With this solvent, solutions of about 35 percent by weight of a polyepoxide resin, e.g., a diglycidyl ether of a bisphenol, can be readily made. The solvent, itself, has a solubility in water of about 0.1 percent by weight or less, yet when the polyepoxide-solvent mixture is contacted with a dilute sulfuric acid solution, the organic phase, by analysis, contains about 12–13 percent by weight water. Solvents similar to the ethylene glycol ether are 2-(4-biphenyloxy)ethanol and the monophenyl ether of propylene glycol.

The invention is operable with certain solvent mixtures comprising mixtures of aromatic hydrocarbons and alkanols containing four to six carbon atoms. Suitable aromatic hydrocarbons include benzene, xylene, toluene and the like, and suitable alkanols include the various butyl, amyl and hexyl alcohols which contain from four to six carbon atoms. The mixed solvent comprises from about 60 to 70 percent by weight aromatic hydrocarbon and from 40 to 30 percent by weight alkanol.

Any of the known polyepoxides can be employed in the preparation of the thermosetting resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one epoxide group per molecule. The polyepoxides may be monomeric or polymeric.

While the invention is applicable to epoxides generally, preferred polyepoxides are glycidyl polyethers of polyhydric alcohols or polyhydric phenols having weights per epoxides group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The hydrolysis reaction is catalyzed by a dilute aqueous acid solution. A preferred concentration of acid ranges from about 0.1 to about 1 percent by weight, although higher concentrations are operable. Catalytic acids which are suitable for the present invention include the mineral acids such as sulfuric acid, hydrochloric acid, phosphoric acid and the like and aromatic organic sulfonic acids such as benzene sulfonic acid, p-toluene sulfonic acid, naphthalene sulfonic acid and the like, and mixtures thereof.

The hydrolysis reaction is best carried out in the temperature range of about 50° to about 374° C. at the autogenous reaction pressure or at superatmospheric pressures, if desired. A temperature range of about 50° to 200° C. is preferred. While it is not essential to conduct the hydrolysis reaction in an inert atmosphere, the use of, e.g., a nitrogen pad, minimizes color formation and is desirable. The amount of acid catalyst may range from about 0.1 to about 1 percent by weight based on the polyepoxide with a preferred range of about 0.2 to about 0.5 percent by weight.

The degree of hydrolysis (or percent conversion) theoretically can be varied widely, but the principal intent of this invention is to provide a process which can readily achieve up to 100 percent conversion of the polyepoxide to the polymeric polyhydric alcohol. When the percent conversion is below about 75 percent, difficulty is encountered in the distillation step due to cross-linking reactions which both reduce product yields and cause operational problems with the equipment.

To further illustrate the invention, the following non-limiting examples are presented.

EXAMPLE 1

Into a suitable reaction vessel were placed 712.5 grams of a diglycidyl ether of 4,4'-isopropylidene diphenol having an epoxide equivalent weight of 875 to 975 and 1356 grams of a monophenyl ether of ethylene glycol. Then, 688 grams of a 0.2 percent by weight solution of sulfuric acid in water was added. The mixture was then stirred and heated at 135° C. for six hours under 100 p.s.i. nitrogen pressure. After cooling and venting to atmospheric pressure, the organic layer was separated and washed twice with an equal volume of hot water. The hydrolyzed resin was recovered by distilling off the glycol solvent under vacuum and a yield of 84.3 percent of theoretical was obtained with a percent conversion of about 99 percent. Similar results are obtained when diglycidyl ethers of 4,4'-isopropylidene diphenol of varying equivalent weight are hydrolyzed by the above process.

EXAMPLE 2

By the same procedure as in Example 1, an epoxy novolac resin having an epoxide equivalent weight of 175–182 was hydrolyzed and a yield of 97.9 percent of theoretical was obatined. The hydrolyzed epoxy novolac contained 14.84 percent by weight hydroxyl, by analysis, which corresponds to about 80 percent conversion.

Similar results are obtained when the solvent utilized in the hydrolysis reaction is a mixture of 65 percent by weight toluene and 35 percent by weight isoamyl alcohol.

The hydrolyzed products are essentially polymeric polyhydric alcohols which have particular utility as chemical intermediates for the preparation of thermosetting resins or resin additives. The hydrolyzed polyepoxides can be further epoxidized and reacted with bisphenol A to increase the molecular weight. The final product has utility as an additive to commercial epoxy resins for purposes such as an anti-caking agent. The hydrolyzed resins are also used to prepare vicinal esters from carboxylic acids without the danger of cross-linking inherent in the process employing the direct reaction of a carboxylic acid with the epoxide resins.

Other modes of applying the principle of this invention may be employed instead of those specifically set forth above provided the elements set forth in any of the following claims or the equivalent of such be employed.

I claim:
1. A process for hydrolyzing polyepoxide compounds which comprises:
   (a) dissolving a polyepoxide compound containing a plurality of 1,2-epoxide groups in a solvent selected from the group consisting of a monophenyl ether of ethylene glycol, a monophenyl ether of propylene glycol, a 2-(4-biphenyloxy)ethanol and a mixed solvent comprising from about 60 to about 70 weight percent of an aromatic hydrocarbon and from about 40 to about 30 weight percent of an alkanol containing from four to six carbon atoms,
   (b) mixing with the polyepoxide solution a dilute aqueous solution of a proton-containing acid catalyst, said catalyst added in an amount to provide about 0.1 to about 1 percent by weight of catalyst based on the weight of polyepoxide,
   (c) heating, with agitation, the mixture at from about 50° to about 200° C. for a time sufficient to effect at least 75 percent hydrolysis of the polyepoxide,
   (d) separating the organic phase from the aqueous phase,
   (e) washing the organic phase free of acid, and
   (f) distilling off the solvent to recover the hydrolyzed product.

2. The process of claim 1 wherein the acid catalyst is selected from the group consisting of sulfuric acid, hydrochloric acid, phosphoric acid and aromatic sulfonic acids.

3. The process of claim 1 wherein the mixed solvent is a mixture of about 65 percent by weight toluene and about 35 percent by weight isoamyl alcohol.

References Cited

Lee et al., "Epoxy Resins," pp. 21 and 22 relied on, New York, 1957.

WILLIAM H. SHORT, *Primary Examiner.*

T. D. KERWIN, *Assistant Examiner.*